(No Model.)
W. J. HADDOCK.
PROCESS OF CONSTRUCTING HYDRAULIC CEMENT BLOCKS OR ASHLERS.
No. 531,842.   Patented Jan. 1, 1895.
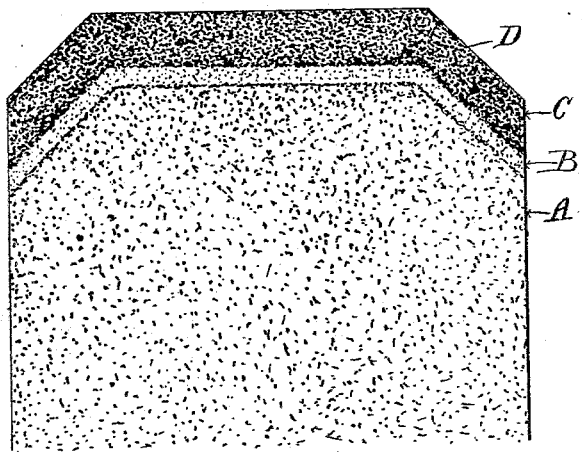
Witnesses
C. C. Budine
G. Arthur Pennington
Wm J. Haddock, Inventor
by Crosby & Dorian
Attorneys

UNITED STATES PATENT OFFICE.

WILLIAM J. HADDOCK, OF IOWA CITY, IOWA.

PROCESS OF CONSTRUCTING HYDRAULIC CEMENT BLOCKS OR ASHLERS.

SPECIFICATION forming part of Letters Patent No. 531,842, dated January 1, 1895.

Application filed May 28, 1894. Serial No. 512,689. (No specimens.)

*To all whom it may concern:*

Be it known that I, WILLIAM J. HADDOCK, a citizen of the United States, residing at Iowa City, in the county of Johnson and State of Iowa, have invented a certain new and useful Process of Constructing Hydraulic Cement Blocks or Ashlers; and I do hereby declare the following to be a full, clear, and exact description of the invention, such as will enable others skilled in the art to which it appertains to make and use the same.

This invention relates to a new and useful process of constructing hydraulic cement blocks or ashlers for the purpose of constructing or veneering walls of buildings, and it consists in the several steps hereinafter referred to and definitely pointed out in the claims.

Heretofore in the construction of cement blocks or ashlers for building purposes it has been deemed impossible to form the same by using natural hydraulic cements in conjunction with artificial or Portland cement and at the same time secure the requisite compactness and strength. It is further a well-known fact that, as heretofore made, of hydraulic cement, blocks where exposed to the elements will absorb a large amount of water, making the structure composed of them wet and cold.

The aim and purpose of this invention is to overcome such defects incident to the construction of hydraulic cement blocks or ashlers adapted for use in building or veneering purposes, by combining natural and artificial cement in one and the same block, but in different strata so that the artificial cement will be the surface for exposure, the natural cement forming the protected part of the block, thus combining great strength and economy.

In the accompanying drawing I have shown a cross-section of a preferred form of block as made by my method.

In said drawing A represents the protected part or base of the block formed of natural cement and sand.

B represents the water-proof stratum of hydraulic cement free from sand, and C represents the outer stratum or facing of the block, composed essentially of artificial or Portland cement and fine sand.

The outer corners of the blocks are chamfered as at D, each stratum being likewise constructed so that the outer stratum C is extended back partly over the sides of the stratum A. By this means when the block is used for building purposes or for building walls the outer face will simulate that of cut stone while the edges of the inner stratum A will be fully protected. By this means I am also enabled to economize in the use of artificial cement.

The method I employ in constructing these blocks is as follows:—I first take a suitable mold of the proper shape and size and of strength sufficient to withstand considerable internal pressure. The block or ashler is then built up, starting at the top first, that is to say, I first place in the bottom of the mold a stratum of Portland cement mixed with sand in the proportion of substantially one volume of cement to two volumes of sand. This amount, however, may be varied. This mass of cement and sand is thoroughly mixed and then moistened by incorporating therewith a sufficient amount of water to moisten each particle of sand and cement, leaving the mass in a moist rather than wet condition. I employ the term "moist" and wish it understood as designating a damp condition rather than a condition approximating a fluid or wet condition. The mass so treated is then thoroughly tamped and compressed, the "moist" condition of the mass preventing the water from oozing out as would be the case were the mixture over-saturated with the water. The material thus tamped becomes solid and firm. In so tamping and compressing the inner section of the block is first treated to form the concave under face as represented in the drawing. I next sift or spread on the exposed face of the compressed material a coating of pure cement, either natural or artificial. I then moisten this coating. The amount of material used in this step is sufficient to form a complete coating or covering and it constitutes a stratum impervious to water. I next take a mixture of natural cement and sand and incorporate therein a sufficient amount of water to moisten each grain thereof so that the mass will compact easily and thoroughly without the water rising or exuding. The proportions of sand and cement are one volume of cement to two volumes of sand. This amount may, however, be slightly varied. The material so mixed is then placed in the mold over the strata of pure cement and thorough and absolute compression is placed on all parts thereof to form a solid and firm block. The mold is now inverted on a level plank or plain surface and is then removed from the block which will retain its shape and the cement is allowed to set.

It is evident that slight variations in the method described and in the article shown can be made without departing from the nature and principle of my invention.

Having thus described the invention, what is claimed as new, and desired to be secured by Letters Patent, is—

1. The method of forming building blocks or ashlers consisting in placing a "moist" mass of artificial cement and sand into the bottom of a suitable mold, thoroughly compressing the same to form a compact outer stratum or facing, coating the exposed face of the stratum with a stratum of pure hydraulic cement, placing a mass of natural hydraulic cement and sand in a mixed moist condition onto the stratum of pure cement, thoroughly compressing the same and finally removing the block from the mold and allowing the cement to set, substantially as described.

2. The method of forming building blocks or ashlers, consisting in placing a moist mass of cement and sand into a suitable mold, compressing the same, applying a coating of pure cement to the exposed face of the material in the mold, placing a moist mass of hydraulic cement and sand on the coating, compressing the same, and finally removing the block from the mold, substantially as described.

In testimony whereof I affix my signature in presence of two witnesses.

WILLIAM J. HADDOCK.

Witnesses:
FRANK T. BREENE,
GEORGE TOMLIN.